US009580963B1

(12) United States Patent
Wilkes et al.

(10) Patent No.: US 9,580,963 B1
(45) Date of Patent: Feb. 28, 2017

(54) SLIDING PLATFORM WITH AN OUTRIGGER THAT ATTACHES TO A LADDER FOR SAFETY

(71) Applicants: Thomas Alfred Wilkes, Sylva, NC (US); Gregory Lee Martin, Sylva, NC (US)

(72) Inventors: Thomas Alfred Wilkes, Sylva, NC (US); Gregory Lee Martin, Sylva, NC (US)

( * ) Notice: Subject to any disclaimer, the term of this patent is extended or adjusted under 35 U.S.C. 154(b) by 0 days.

(21) Appl. No.: 14/978,005

(22) Filed: Dec. 22, 2015

(51) Int. Cl.
*E06C 7/48* (2006.01)
*F16M 13/02* (2006.01)
*E06C 7/14* (2006.01)

(52) U.S. Cl.
CPC ................ *E06C 7/488* (2013.01); *E06C 7/14* (2013.01); *F16M 13/02* (2013.01); *E06C 7/48* (2013.01)

(58) Field of Classification Search
USPC .................. 182/230, 129, 107; 248/210, 238
See application file for complete search history.

(56) References Cited

U.S. PATENT DOCUMENTS 5,275,256 A * 1/1994 Ellzey ........................ E06C 7/14 104/246
7,185,739 B1 * 3/2007 Blehm .................... E06C 1/345 182/107
2004/0089501 A1 * 5/2004 Hockensmith ............ E06C 7/48 182/107
2004/0140155 A1 * 7/2004 Yang .......................... E06C 7/48 182/107
2005/0167197 A1 * 8/2005 Logiudice ................. E06C 7/48 182/107
2011/0079467 A1 * 4/2011 Mares ........................ E06C 7/14 182/129
2015/0337596 A1 * 11/2015 Cherevko ................. E06C 1/06 182/107

* cited by examiner

*Primary Examiner* — Alfred J Wujciak
(74) *Attorney, Agent, or Firm* — Mark Young, P.A.

(57) ABSTRACT

A sliding platform with an outrigger attaches to a ladder for stabilization by urging the outrigger against the underside of a structure (e.g., an eave). The device prevents the ladder from sliding or falling away from the structure. The device is adjustable from right to left to accommodate an angle of the engaged underside.

18 Claims, 13 Drawing Sheets

SLIDING PLATFORM WITH AN OUTRIGGER THAT ATTACHES TO A LADDER FOR SAFETY

BACKGROUND OF THE INVENTION

There is a need to prevent accidents caused by a ladder falling or sliding away from a structure. When used properly, it prevents a ladder from falling away from a house or structure. The only other device that I have ever seen is a permanently attached stabilizer bar, requiring tools to affix or change ladders, and it does not prevent the ladder from falling. Our device is no tools required. The device prevents the ladder from falling. The device will adjust from right to left to accommodate the angle of the eave.

SUMMARY OF THE INVENTION

The advantages of this invention is that it attaches to the ladder without requiring tools while the ladder is still on the ground. The ladder is then leaned up against the overhang of the roof line and the device travels up the ladder rails till it reaches the overhang which effectively pins the ladder to the structure by pushing up on the underneath side of the overhang. The device will also adjust to the angle of the gable end overhang for an adjustment of 45 degrees in either direction for a total of 90 degrees of adjustment. If the device is on either side of the peak of a roof at the gable it is prevented from sliding to the open or higher side by the use of a bracket and rod which is pinned to the rung of the ladder just above the roof which prevents the ladder from sliding or falling to the higher side of the gable end.

BRIEF DESCRIPTION OF THE DIFFERENT DRAWING VIEWS

DETAILED DESCRIPTION

As stated above, it prevents a ladder from falling away from a house or structure. The invention claimed here solves this problem.

The device attaches to a ladder while the person is still on the ground. Then the device goes up the ladder by pulling on a rope, till it reaches the eave of the house or building. It then adjusts to the angle of the eave and applies pressure against the underside of the eave preventing the top of the ladder from moving or falling away from the building.

The claimed invention differs from what currently exists. It attaches to the ladder before ever having to set foot on the ladder. It doesn't require tools to attach. It travels up the ladder by pulling on a rope and adjusts to the eave of the structure, so that the ladder becomes locked in place before having to climb up the ladder. It also will interchange with ladders without requiring tools.

This invention is an improvement on what currently exists. It attaches to the ladder before ever having to set foot on the ladder. It doesn't require tools to attach. It travels up the ladder by pulling on a rope and adjusts to the eave of the structure, so that the ladder becomes locked in place before having to climb up the ladder. It also will interchange with ladders without requiring tools.

Previous devices do not prevent the ladder from falling. They do not adjust to the eave of the structure. This device requires no tools. The device prevents the ladder from falling. The device will adjust from right to left to accommodate the angle of the eave.

Figure 1:
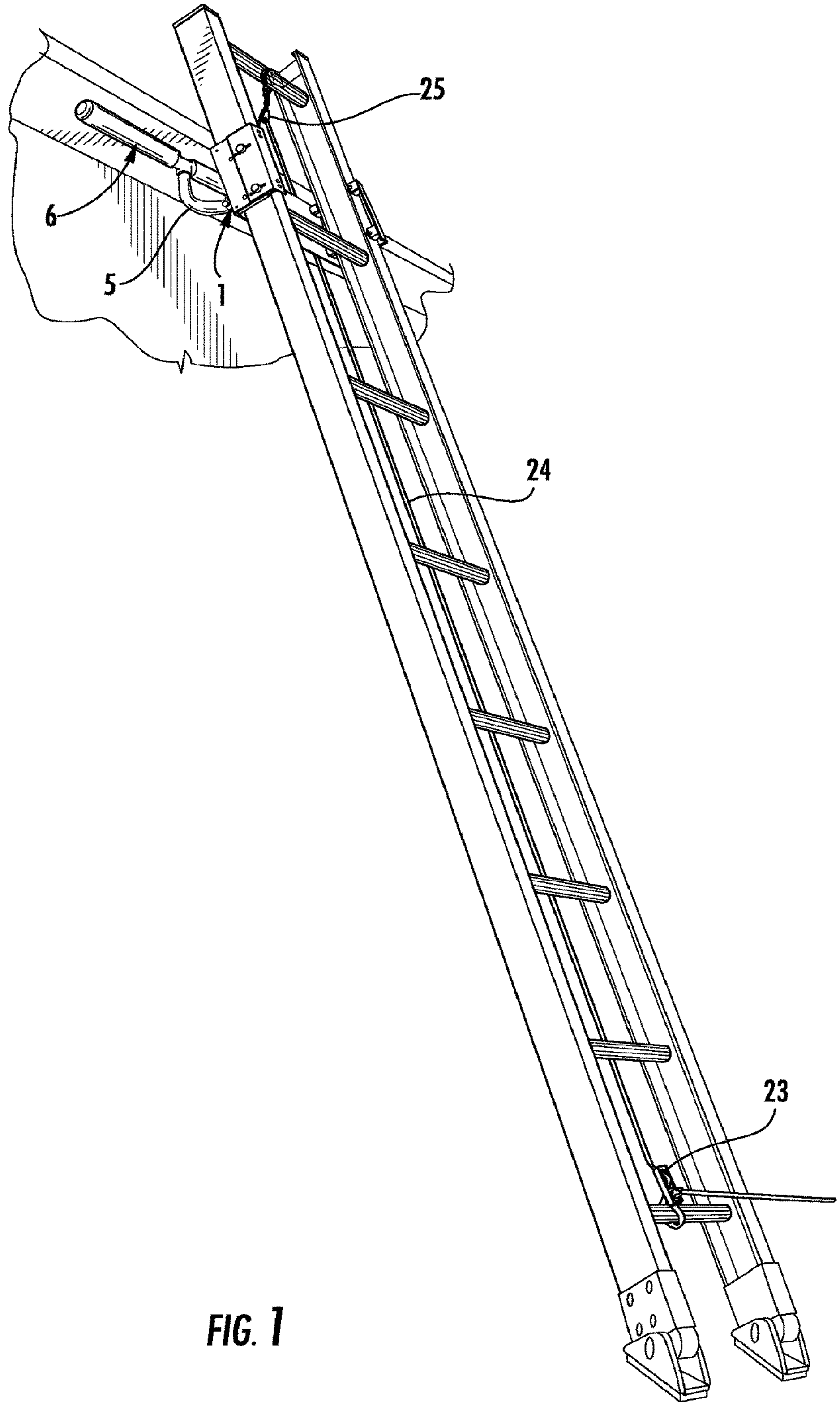
FIG. 1 is a view of the device as it is intended to be used on the ladder up against the overhang of the roofline.
Figure 2:
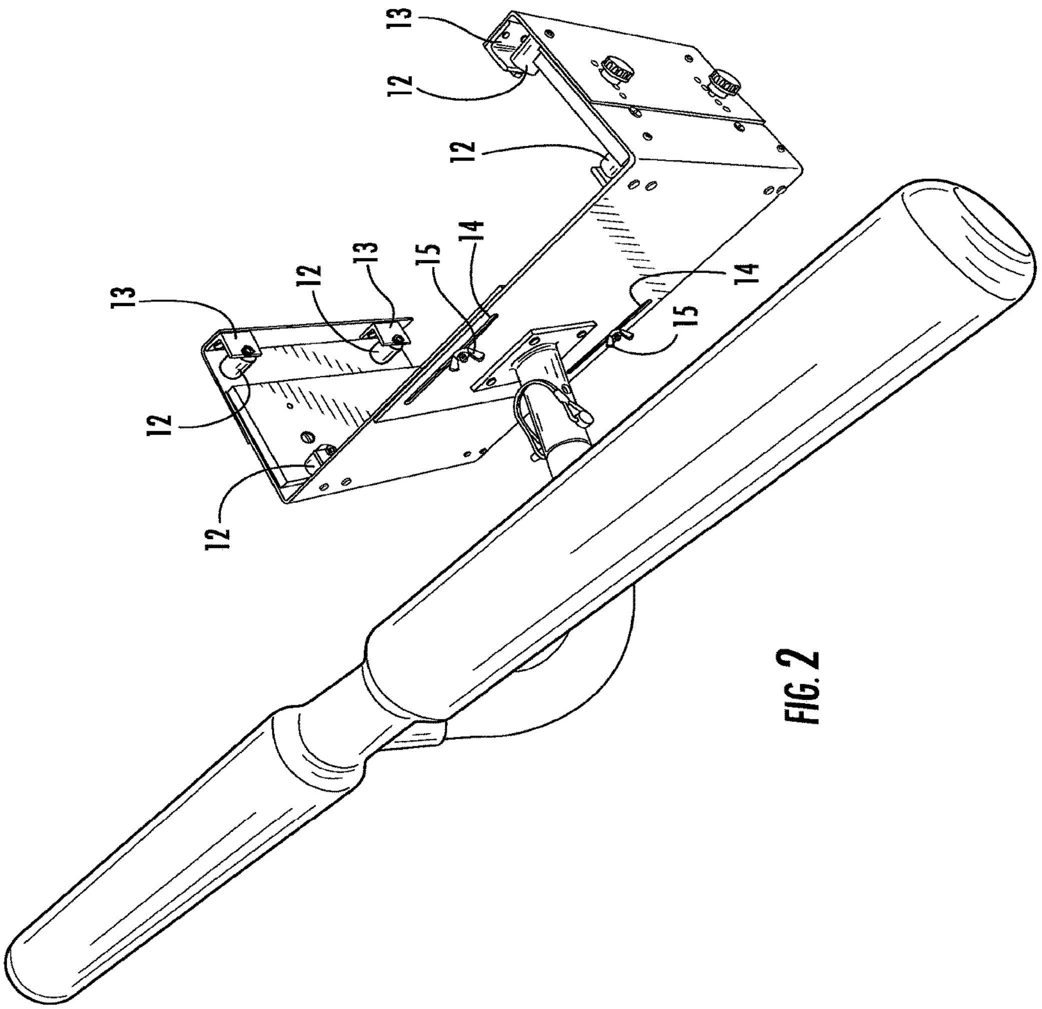
FIG. 2 is a view looking down from above and left of center of the device.
Figure 3:
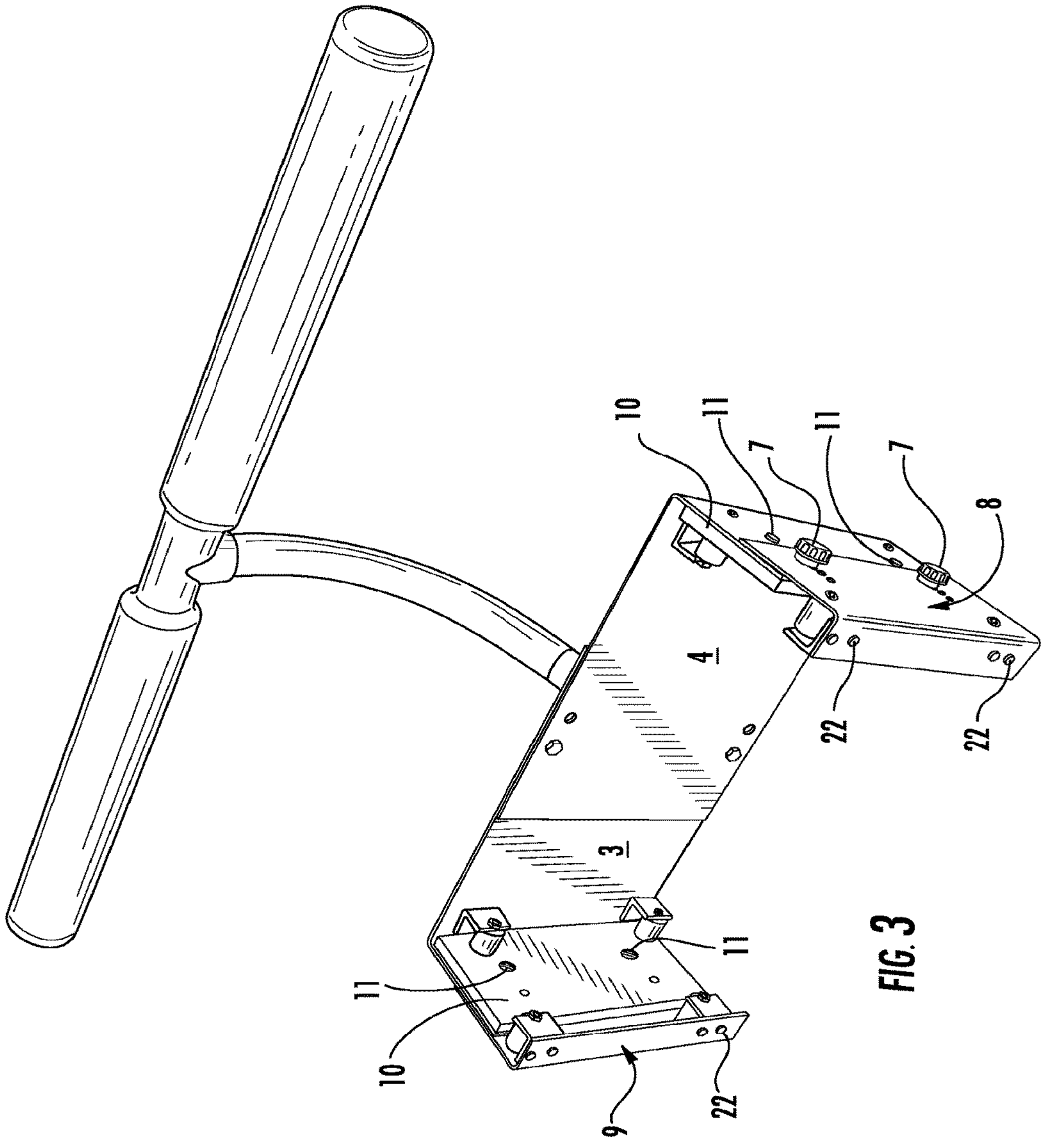
FIG. 3 is a view looking down and right of center of the back of the device.
Figure 4A:
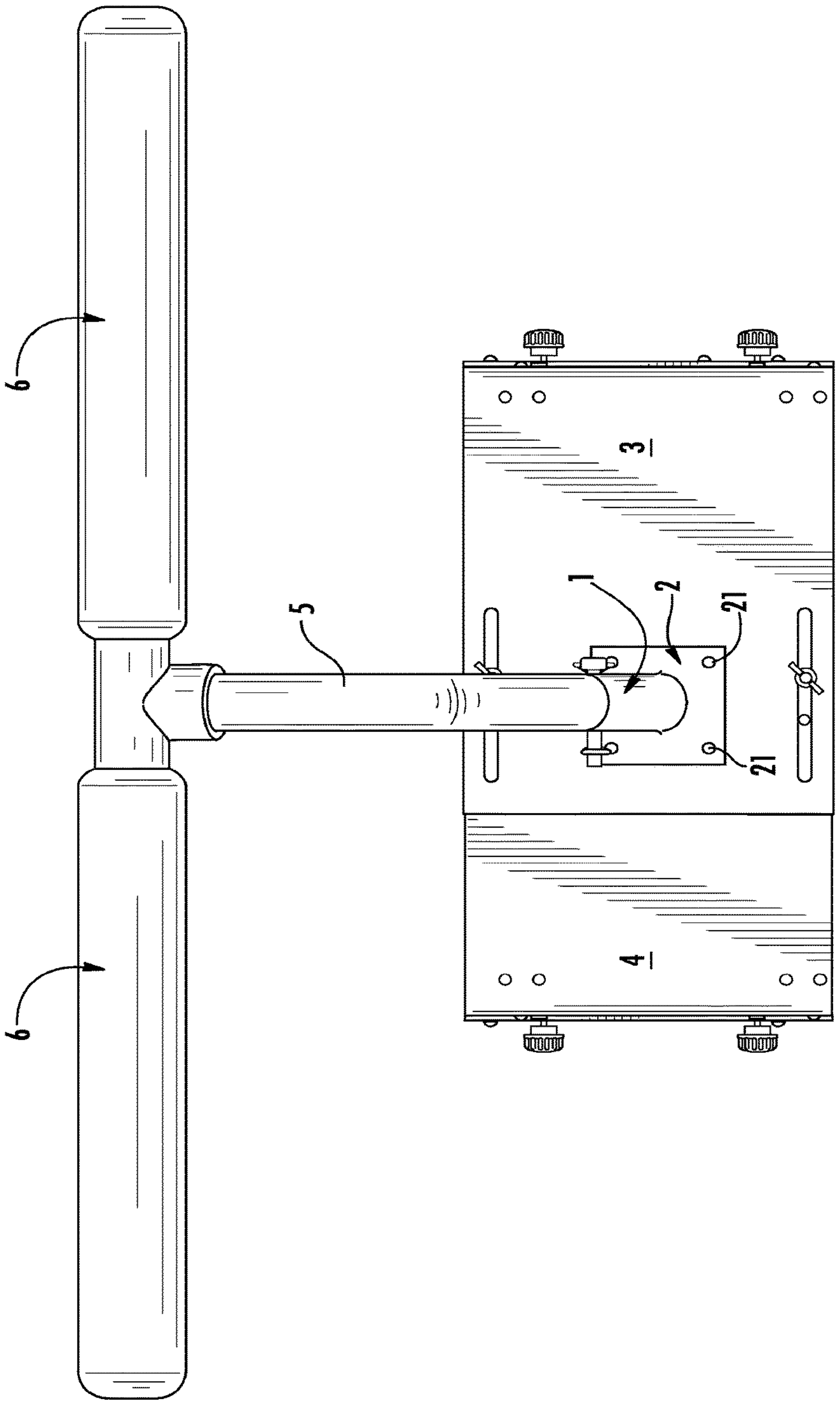
FIG. 4A is a view looking forward at the front of the device.
Figure 4B:
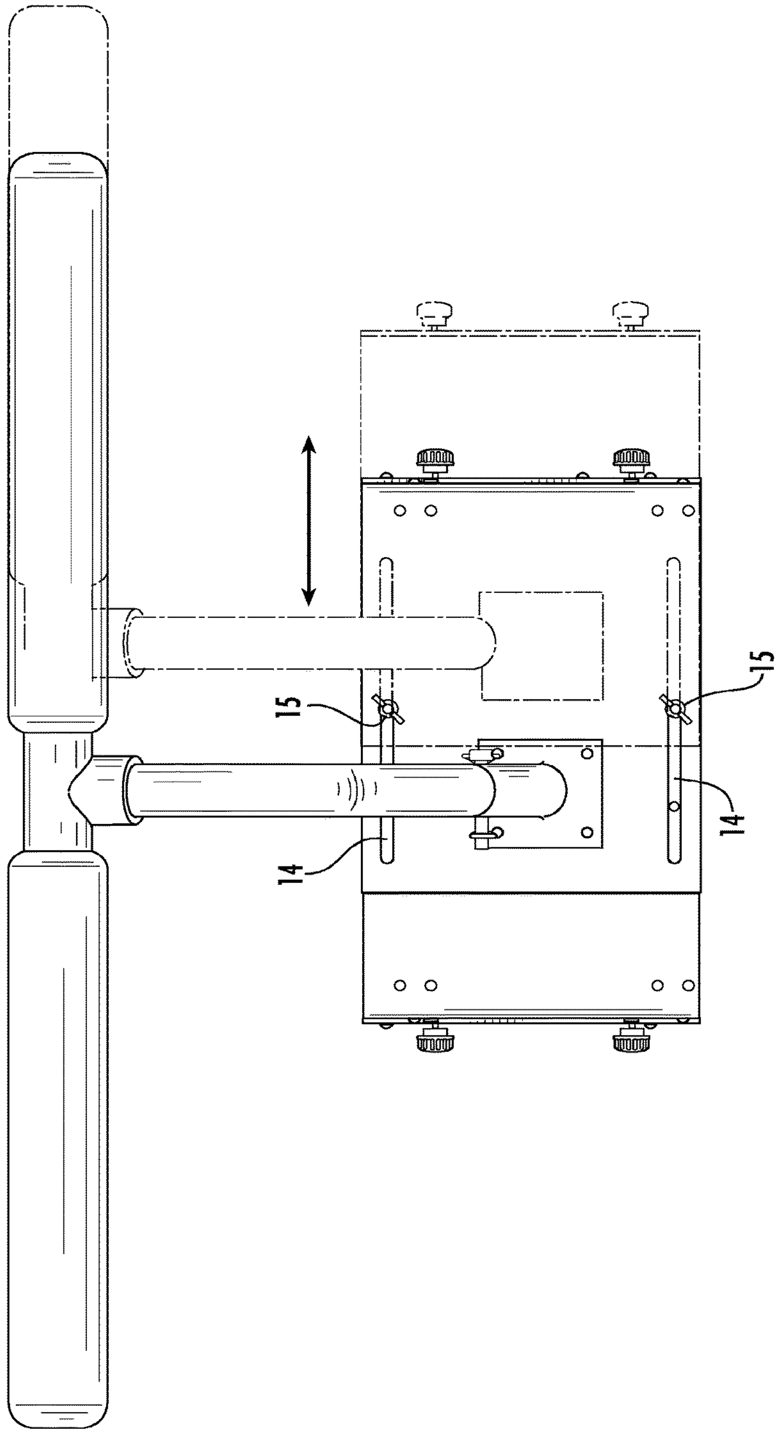
FIG. 4B is a view looking forward at the front of the device showing how it slides to get the width of the adjustment.
Figure 5A:
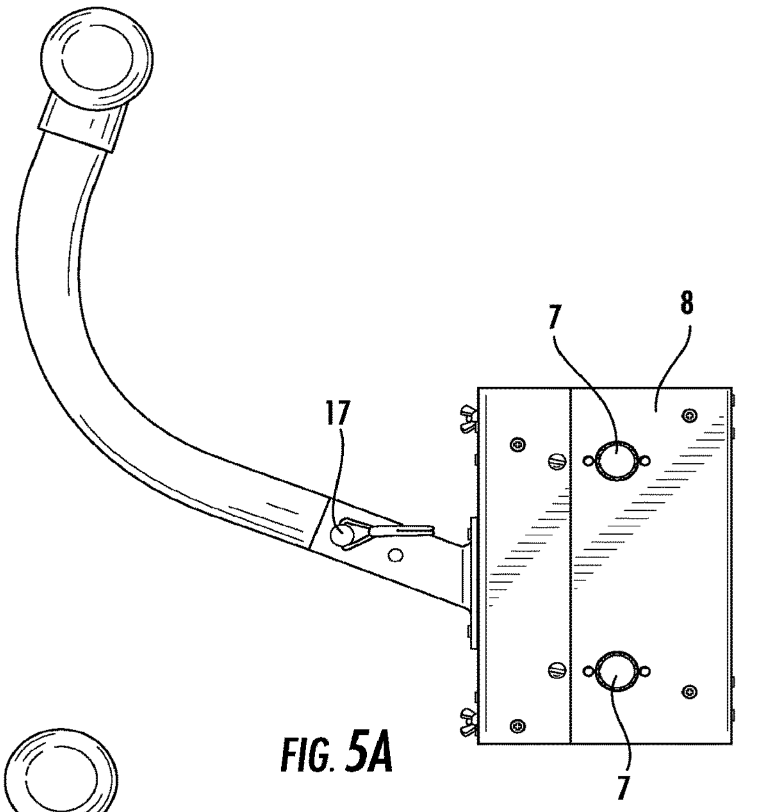
FIG. 5A is a view of the left side of the device.

| Number | FIG. | Description |
|---|---|---|
| 1 | 4A | Main body shaft outer |
| 2 | 4A | Main body shaft moulting plate |
| 3 | 4A | Main body upper frame |
| 4 | 4A | Main body lower frame |
| 5 | 4A | 90 degree outrigger support |
| 6 | 4A | Outrigger |
| 7 | FIGS.3 5A & 5B | Threaded shaft rod |
| 8 | FIGS.3 5A & 5B | Right side adjustable depth wall |
| 9 | 3 | Left side adjustabb depth wall |
| 10 | 3 | Spacer |
| 11 | 3 | Sex bolt |
| 12 | 2 | Roller |
| 13 | 2 | Roller track |
| 14 | 2 | Width adjustment slot |
| 15 | 2 | Wingnut for width adjustment |
| 16 | 5B | Holes for depth adjustment |
| 17 | 5A & 5B | Pin for rope attachment and outrigger adjustment |
| 18 | 8A & 7 | Hole for pin for allowing stationary outrigger |
| 19 | 8A & 7 | Hole and slot for pin allowing 90 degree adjustment |
| 21 | 4A | Solid steel rivet to fasten main body shaft mounting plate to main body |
| 22 | 3 | Rivets to fasten roller track to side |

-continued

| Number | FIG. | Description |
|---|---|---|
| | | adjustable wall |
| 23 | 13 & 10 | Cord tensioner |
| 24 | 12 | Cord |
| 25 | 12 | Pulley for cord |
| 26 | 10 & 11 | Ladder rung bracket |
| 27 | 10 & 11 | Above roof rod |
| 28 | 11 | Pins to attach above roof rod to ladder rung bracket |
| 29 | 8A | Main body shaft inner |

RELATIONSHIP BETWEEN COMPONENTS: Item #6 is the outrigger and attaches to item #5 which is a 90 degree outrigger support. Item #'s 1 and 2 form the mounting plate and the main body shaft which affixes the outrigger #5 & 6 to the main body of the device #3.

Item #2 holds the entire outrigger assembly to the main body #3 of the device.

Item #3 slides a top item #4 to allow the width adjustment of the device.

Item #7 is a threaded shaft knob that allows for the depth adjustments of the right #8 and left #9 adjustable depth walls.

Item #10 is a spacer used to steady the ascent and descent of the device on the ladder.

Item #11 is a sex bolt used to affix the spacers #10 to the main body upper frame #3 and the main body lower frame #4. This spacer is also glued to the metal as well.

Item #12 are rollers which are fastened by pins to the roller track #13. These allow the device to roll up and down the ladder rails.

Item #14 are located on item #3 and are the slots that allow the width adjustments.

Item #15 are wingnuts to loosen and tighten for the main body #2 & #3 to slide for the width adjustment.

Item #16 are holes through which item #7 thread to allow for depth adjustment.

Item #17 is the pin for allowing outrigger adjustment as well as affixing the pull rope cord #24 to.

Item #18 is the hole for the pin allowing stationary outrigger positioning.

Item #19 is the hole and slot for pin that allow for 90 degree outrigger adjustment.

Item #21 is solid steel rivets used to fasten main body shaft #2 to the main body upper frame #3.

Item #22 is solid steel rivets used to fasten roller track to side adjustable walls Item #23 is the cord tensioner to hold the #24 cord tight.

Item #25 is the pulley to allow the cord #24 to pull with ease across the top of the ladder.

Item #26 is the ladder rung bracket to attach around the ladder rung so as to affix #27 the above roof rod to the ladder.

Item #28 are pins that attach #27 the above roof rod to the ladder rung bracket #26.

Item #29 is the main body shaft inner which allows #1 to slide down over to help with the side to side 90 degree movement of the outrigger.

How the Invention Works

The main body and adjustable walls adjust to fit the different widths and depths of ladder rails. The rollers allow the main body to travel by pulling on the end of a rope up and down the rails of the ladder. The hardware on the shaft allows the support components to pivot 45 degrees left and right to accommodate the different angles of a roofline. The outrigger pushes up against the eave and prevents the top of the ladder from falling.

How to Make the Invention

You would cut and bend metal. Then you would cut and drill the slots and holes required to allow for necessary adjustments. You would then attach the rollers and roller tracks. You would then attach the base plate and arm to hold the outrigger. You would then cut a notch for the outrigger to have its 90 degrees of adjustment. Then you would cut and assemble the outrigger that touches the eave of the structure.

All elements are necessary. None are optional. There is a ladder rung bracket with an above roof rod that attaches to the rung of the ladder above and closest to the roofline that prevents the invention from sliding to the highest side when the device is used on a gable end, but you would not need to climb the ladder to attach this feature.

The angle and strength of materials used on the 90 degree outrigger support and the outrigger could conceivably allow the device to be used to ferry materials up or down the ladder, but the intended purpose is for safety.

How to Use the Invention

Figure 5B:
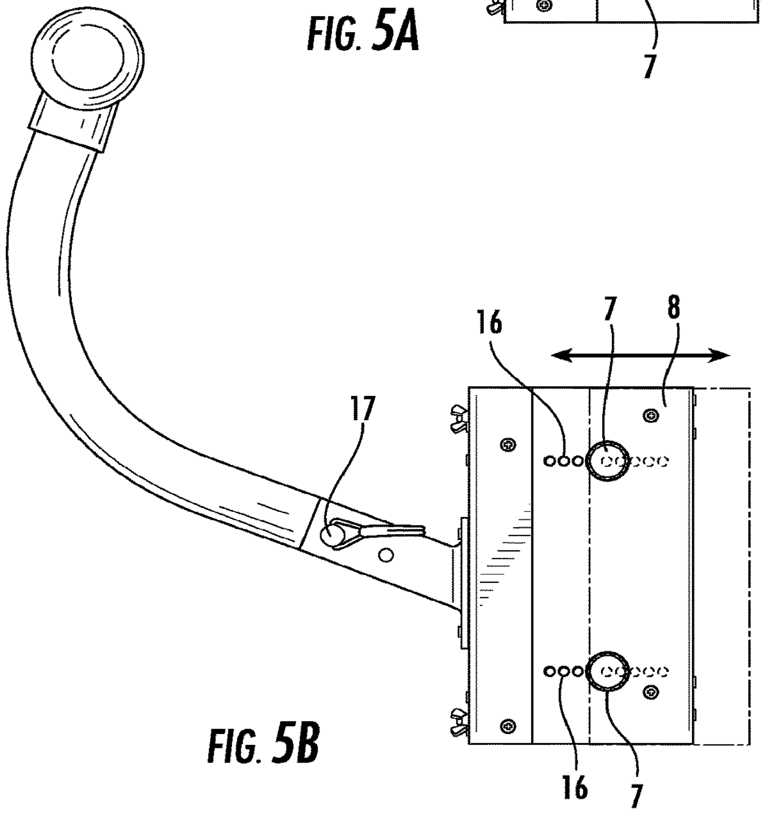
FIG. 5B is a view of the left side of the device showing how the depth of the ladder rail adjustment is accomplished.
Figure 6:
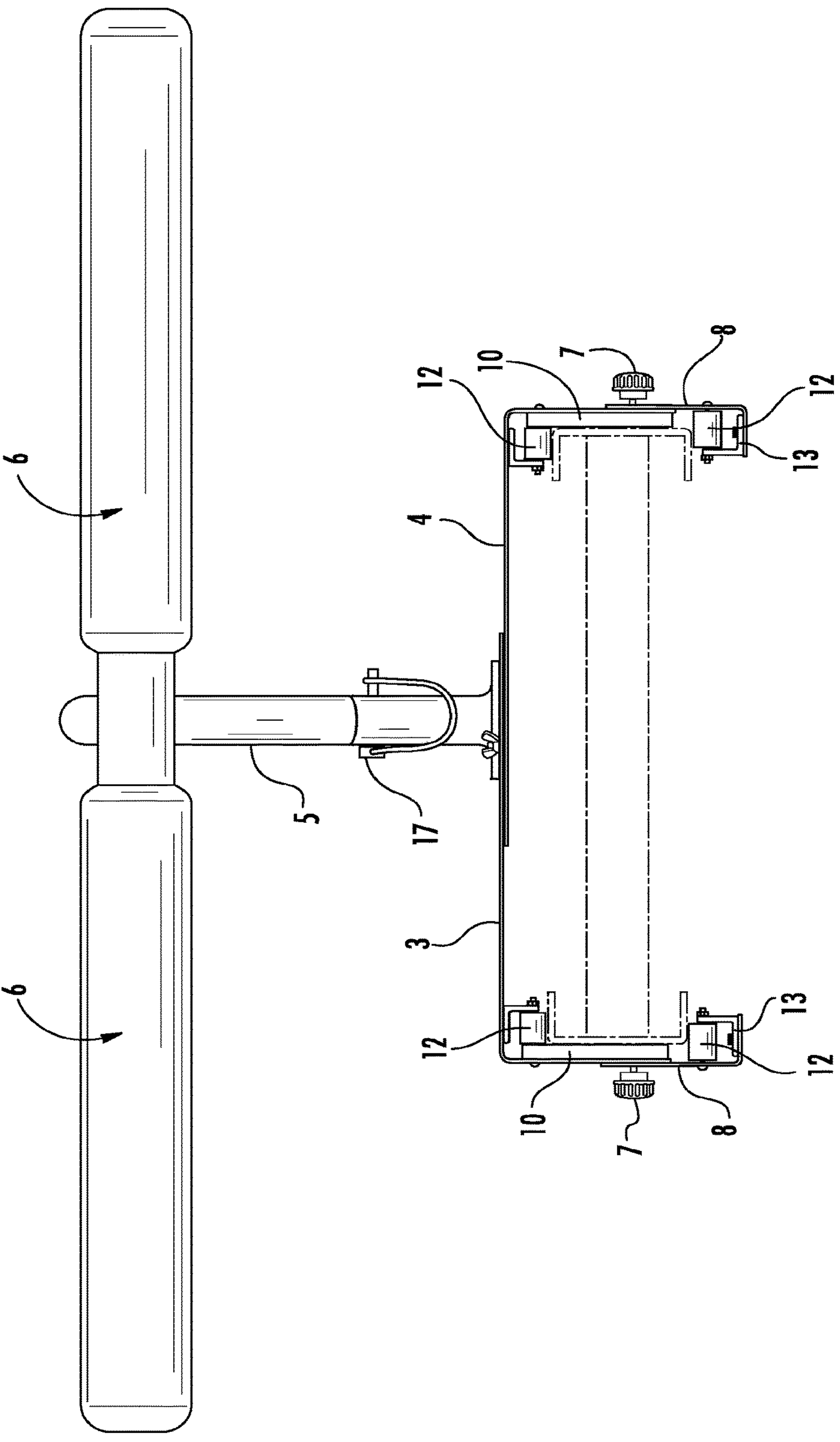
FIG. 6 is a view looking directly down at the device showing the overlapping plates allowing the width adjustment and the plates that allow for depth of ladder rail adjustment. This view also shows the rollers that run along the edge of the ladder rail for the device to roll up and down the ladder.
Figure 7:
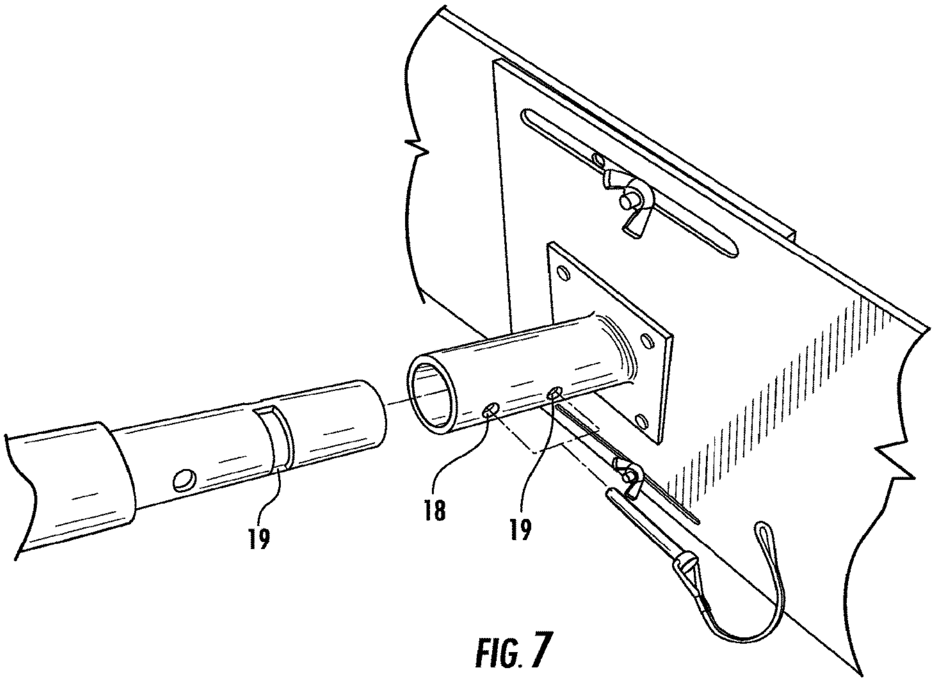
FIG. 7 is an exploded view of how the device outrigger is pinned to remain stationary for straight eaves or allowed to pivot 90 degrees for adjustment for gable ends.
Figure 8A:
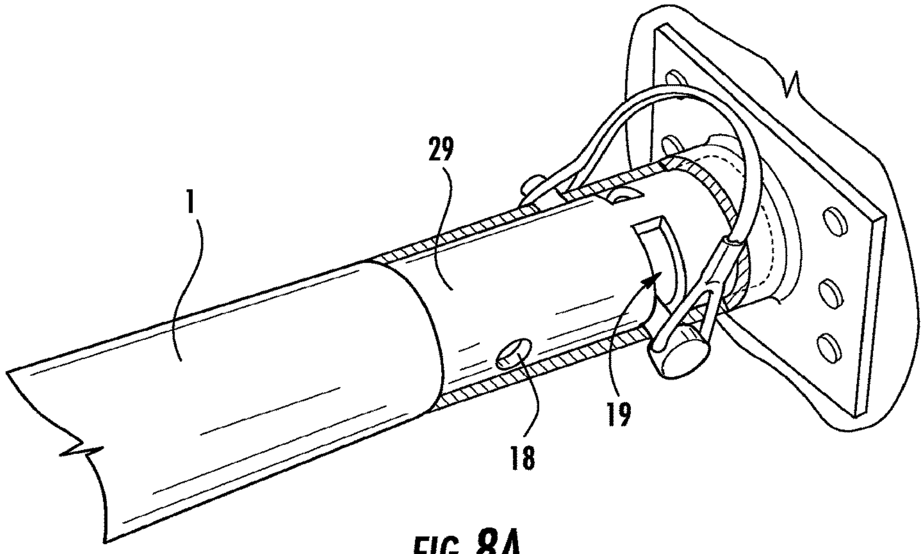
FIG. 8A shows the slot pin in the slot that allows the outrigger to pivot 45 degrees right of center.
Figure 8B:
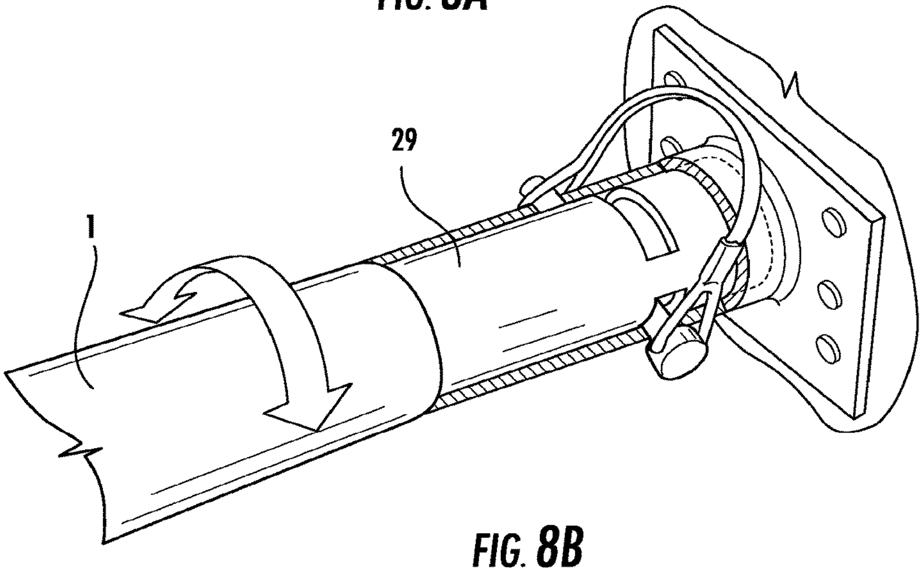
FIG. 8B show the pin in the slot allowing the outrigger to pivot 45 degrees left of the center.
Figure 9:
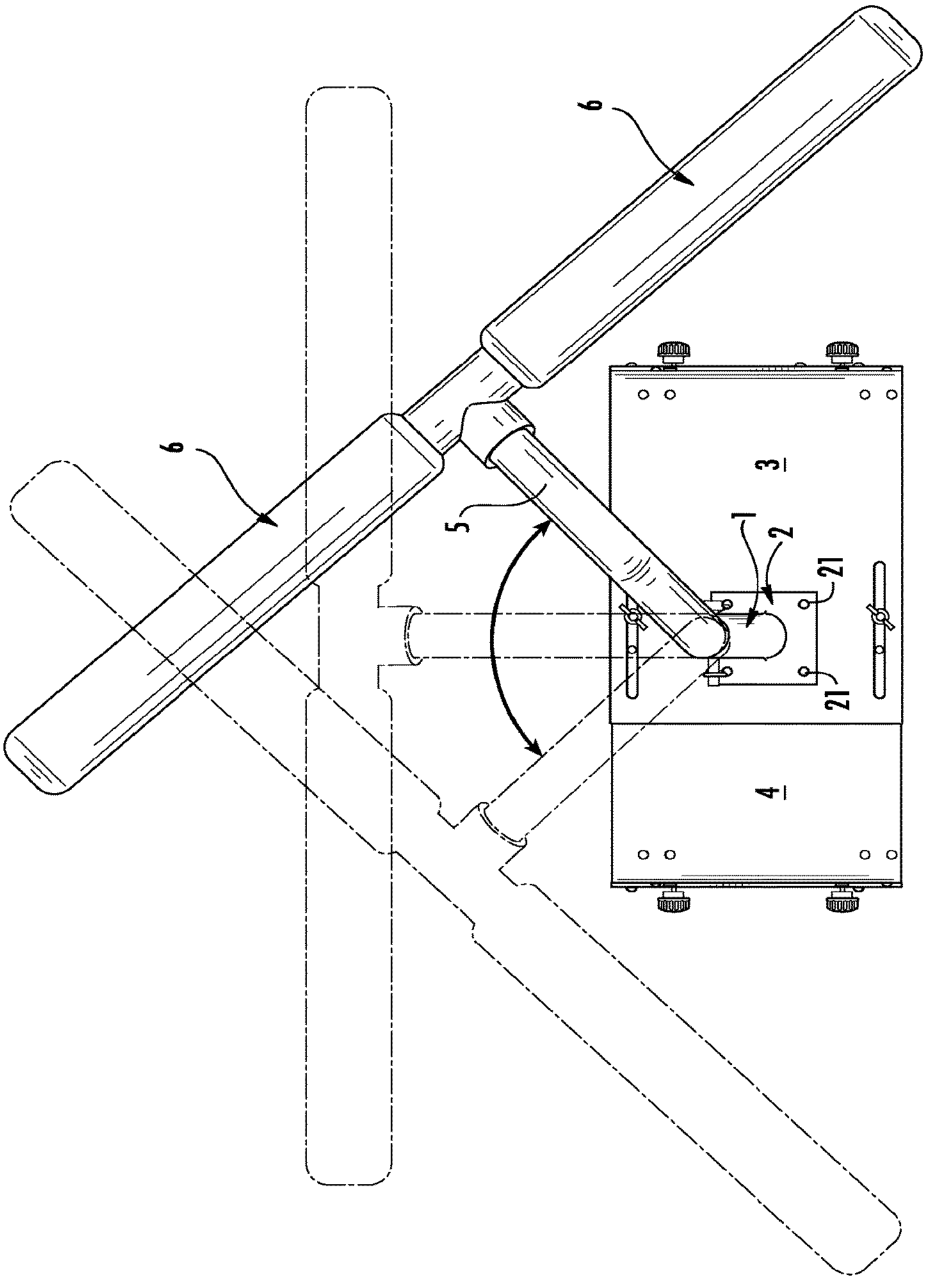
FIG. 9 is a front view showing the range of motion the outrigger is capable of; center, 45 degrees left and 45 degrees right.
Figure 10:
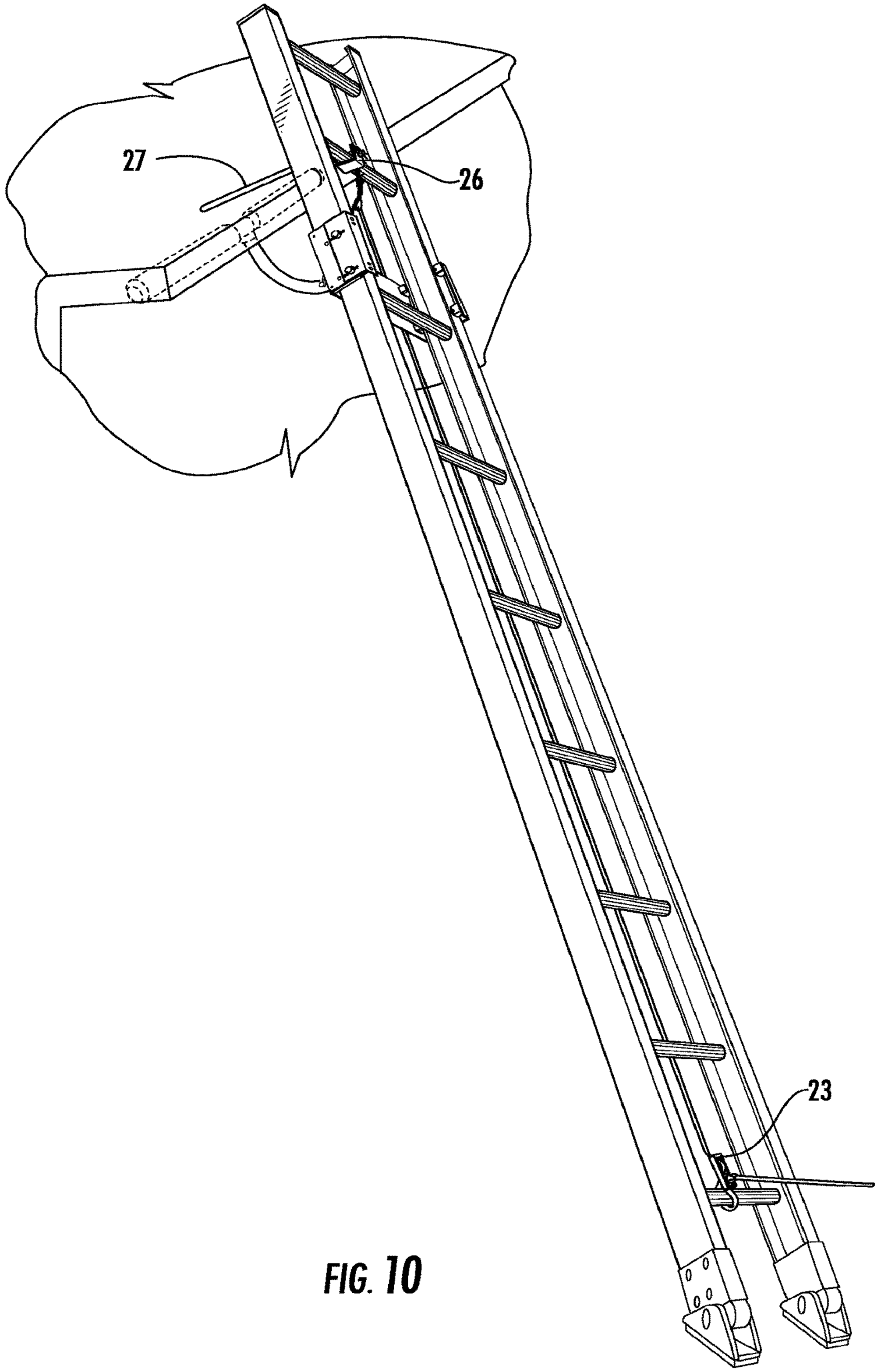
FIG. 10 is a view showing the device in use on the ladder with the outrigger underneath the gable end and the ladder rung bracket attached to the rung of the ladder just above the roof.
Figure 11:
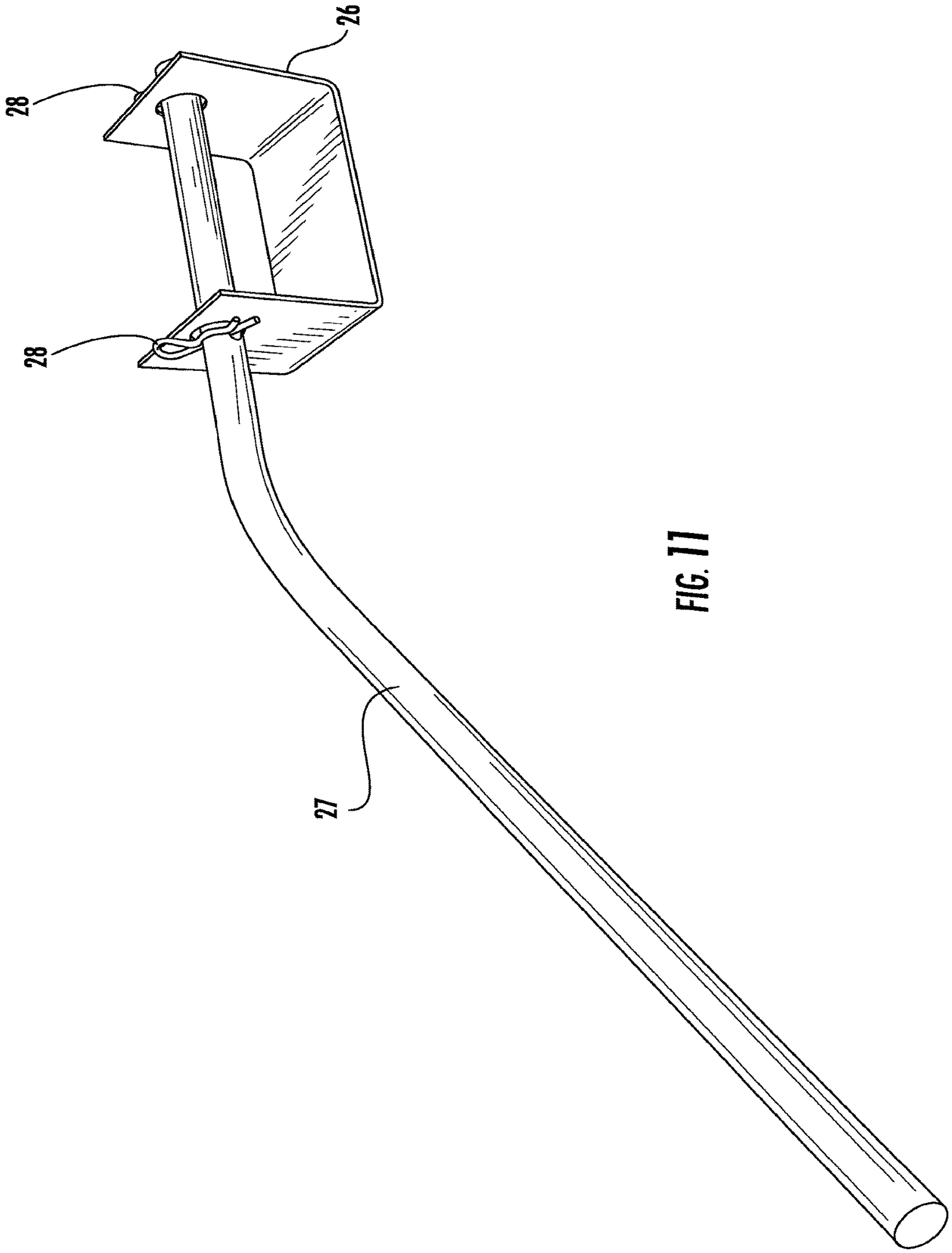
FIG. 11 shows the above roof rod and the ladder rung bracket assembly.
Figure 12:
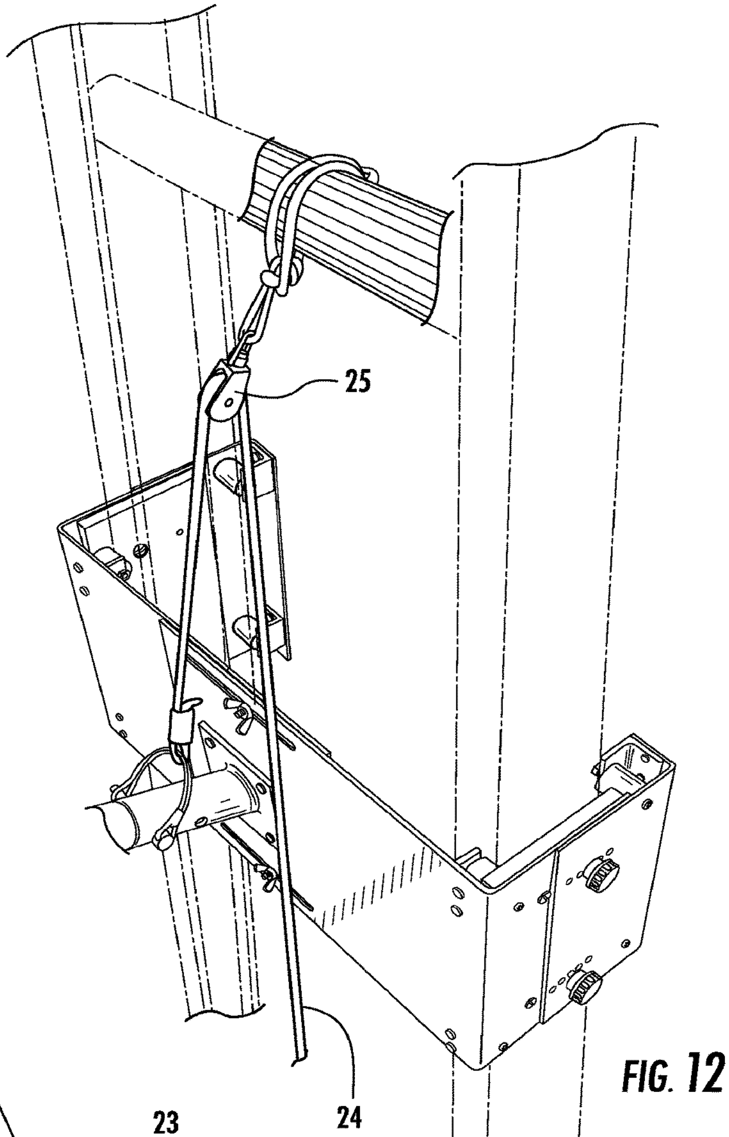
FIG. 12 shows how the pull cord is attached to the device then through a pulley in order to pull the device up the ladder.
Figure 13:
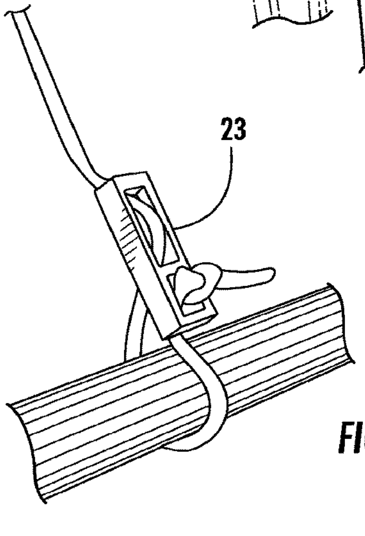
FIG. 13 is a view of the cord tensioner to prevent the pull cord from loosening once the device is in place at the overhang of the structure.

To use the device the ladder should be laying on the ground with the side of the ladder that will be pointed away from the structure against the ground. You would then loosen the wingnuts and adjust the width of the device to fit the ladder's width. Then tighten wingnuts to lock the width adjustment in place. Then loosen knobs on both sides of the device and set to the appropriate hole that allows for the adjustment of the depth of the ladder rail. Now attach pulley to an upper rung of the ladder and put the rope through pulley and down ladder to attach it to the pin #17 on FIG. 5B. That connects the main body shaft to the device and the outrigger. There are 2 holes in the main body shaft. One hole keeps the outrigger straight for a straight eave and the other hole will allow the outrigger to adjust right or left 45 degrees in either direction. Attach the rope to the pin. Lean the ladder against the overhang of the structure. Once the outrigger is firmly against the overhang of the structure then the cord is pulled tight in the cord tensioner which prevents the cord and device from slipping.

If the device is to be used on a gable end then while the ladder is still lying on the ground attach the ladder rung bracket to the rung of the ladder that will be above and closest to the roof of the structure. Pin the above roof rod to the ladder rung bracket and lean the ladder up against the structure and position the above roof rod against the roof before pulling the rope that moves the device. That will prevent the ladder from sliding to the high side on a gable end.

When using on both a straight eave and a gable eave the ladder is secured into position affixing it to the eave before ever having to set foot on the ladder.

The invention claimed is:

1. A ladder stabilizer for urging stabilizing force against the underside of a structure, said ladder having a ladder thickness and a ladder width, and said ladder stabilizer comprising:

a frame comprising a right side, a left side contralateral and substantially parallel to the right side and an intermediate portion extending from the right side to the left side, the intermediate portion being substantially orthogonal to the left side and the right side, and the frame having a top edge, and the left side having a left panel and left flanged free end perpendicular to the left panel, and the right side having a right panel and right flanged free end perpendicular to the right panel;

a rectangular channel defined between the right side, left side and intermediate portion, the channel having a channel thickness being at least the ladder thickness and the channel having a channel width being at least the ladder width;

an outrigger having a right outrigger side and a left outrigger side and a length from the right outrigger side to the left outrigger side; the right outrigger side including a right upper contact surface and an opposite right outrigger bottom and the left outrigger side including a left upper contact surface and an opposite left outrigger bottom, the right upper contact surface and left upper contact surface oriented to contact the underside of the structure;

an outrigger coupling extending from the frame to the outrigger and supporting the outrigger distal to the channel and at an outrigger peak height above the top edge of the frame, the intermediate portion being intermediate to the channel and outrigger.

2. The ladder stabilizer of claim 1, the intermediate portion comprising a right intermediate portion, a left intermediate portion, and an adjustable threaded fastener, each of the first intermediate portion and the second intermediate portion having a lateral end and a medial end opposite the lateral end, the medial end of the right intermediate portion abutting the medial end of the left intermediate portion and being disposed in adjustable overlapping alignment, the lateral end of the right intermediate portion extending to the right side of the frame, and the lateral end of the left intermediate portion extending to the left side of the frame, and the adjustable threaded fastener releasably securing the medial end of the right intermediate portion to the medial end of the left intermediate portion at one of a range of intermediate positions.

3. The ladder stabilizer of claim 1, the outrigger coupling comprising a support structure including a first segment and a second segment extending from the first segment at an angle of about 90 degrees relative to the first segment, the first segment being attached to the intermediate portion of the frame and the second segment being attached to the outrigger.

4. The ladder stabilizer of claim 3, further comprising a socket attached to the intermediate portion of the frame, the socket receiving a portion of the first segment and attaching the first segment to the intermediate portion of the frame.

5. The ladder stabilizer of claim 4, further comprising a socket attached to the intermediate portion of the frame, the portion of the first segment received in the socket being rotatable relative to the socket and releasably secured at an angular orientation of a range of angular orientations relative to the socket, the angular orientation defining an orientation of the outrigger relative to the horizontal.

6. The ladder stabilizer of claim 1, each of the right panel and left panel of the frame comprising a proximal portion, a distal portion, and an adjustable threaded fastener, the distal portion of the left panel connecting to the lateral end of the left intermediate portion, the distal portion of the right panel connecting to the lateral end of the right intermediate portion, the distal portion of the left panel and the proximal portion of the left panel being disposed in adjustable overlapping alignment, the distal portion of the right panel and the proximal portion of the right panel being disposed in adjustable overlapping alignment, and the adjustable threaded fastener of the left panel releasably securing the distal portion of the left panel to the proximal portion of the left panel at one of a range of left panel positions, and the adjustable threaded fastener of the right panel releasably securing the distal portion of the right panel to the proximal portion of the right panel at one of a range of right panel positions.

7. The ladder stabilizer of claim 1, further comprising a left roller attached to the left panel and extending into the channel, and a right roller attached to the right panel and extending into the channel.

8. The ladder stabilizer of claim 1, further comprising a hoist, said hoist comprising a pulley secured above the frame, a tensioner secured below the frame, a tether having a first end and an opposite second end, a first portion of the tether adjacent to the first end being trained over the pulley, and a second portion of the tether adjacent to the second end of the tether being releasably locked in the tensioner, and the first end of the tether being coupled to the frame.

9. A ladder stabilizer for urging stabilizing force against the underside of a structure, said ladder having a ladder thickness and a ladder width, and said ladder stabilizer comprising:

a frame comprising a right side, a left side contralateral and substantially parallel to the right side and an intermediate portion extending from the right side to the left side, the intermediate portion being substantially orthogonal to the left side and the right side, and the frame having a top edge, and the left side having a left panel and left flanged free end perpendicular to the left panel, and the right side having a right panel and right flanged free end perpendicular to the right panel;

a rectangular channel defined between the right side, left side and intermediate portion, the channel having a channel thickness being at least the ladder thickness and the channel having a channel width being at least the ladder width;

an outrigger having a right outrigger side and a left outrigger side and a length from the right outrigger side to the left outrigger side; the right outrigger side including a right upper contact surface and an opposite right outrigger bottom and the left outrigger side including a left upper contact surface and an opposite left outrigger bottom, the right upper contact surface and left upper contact surface oriented to contact the underside of the structure;

an outrigger coupling extending from the frame to the outrigger and supporting the outrigger distal to the channel and at an outrigger peak height above the top edge of the frame, the intermediate portion being intermediate to the channel and outrigger;

the intermediate portion comprising a right intermediate portion, a left intermediate portion, and an adjustable threaded fastener, each of the first intermediate portion and the second intermediate portion having a lateral end and a medial end opposite the lateral end, the medial end of the right intermediate portion abutting the medial end of the left intermediate portion and being disposed in adjustable overlapping alignment, the lateral end of the right intermediate portion extending to the right side of the frame, and the lateral end of the left intermediate portion extending to the left side of the frame, and the adjustable threaded fastener releasably securing the medial end of the right intermediate portion to the medial end of the left intermediate portion at one of a range of intermediate positions;

the outrigger coupling comprising a support structure including a first segment and a second segment extending from the first segment at an angle of about 90 degrees relative to the first segment, the first segment being attached to the intermediate portion of the frame and the second segment being attached to the outrigger.

10. The ladder stabilizer of claim 9, further comprising a socket attached to the intermediate portion of the frame, the socket receiving a portion of the first segment and attaching the first segment to the intermediate portion of the frame.

11. The ladder stabilizer of claim 9, further comprising a socket attached to the intermediate portion of the frame, the portion of the first segment received in the socket being rotatable relative to the socket and releasably secured at an angular orientation of a range of angular orientations relative to the socket, the angular orientation defining an orientation of the outrigger relative to the horizontal.

12. The ladder stabilizer of claim 9, each of the right panel and left panel of the frame comprising a proximal portion, a distal portion, and an adjustable threaded fastener, the distal portion of the left panel connecting to the lateral end of the left intermediate portion, the distal portion of the right panel connecting to the lateral end of the right intermediate portion, the distal portion of the left panel and the proximal portion of the left panel being disposed in adjustable overlapping alignment, the distal portion of the right panel and the proximal portion of the right panel being disposed in adjustable overlapping alignment, and the adjustable threaded fastener of the left panel releasably securing the distal portion of the left panel to the proximal portion of the left panel at one of a range of left panel positions, and the adjustable threaded fastener of the right panel releasably securing the distal portion of the right panel to the proximal portion of the right panel at one of a range of right panel positions.

13. The ladder stabilizer of claim 9, further comprising a left roller attached to the left panel and extending into the channel, and a right roller attached to the right panel and extending into the channel.

14. The ladder stabilizer of claim 9, further comprising a hoist, said hoist comprising a pulley secured above the frame, a tensioner secured below the frame, a tether having a first end and an opposite second end, a first portion of the tether adjacent to the first end being trained over the pulley, and a second portion of the tether adjacent to the second end of the tether being releasably locked in the tensioner, and the first end of the tether being coupled to the frame.

15. A ladder stabilizer for urging stabilizing force against the underside of a structure, said ladder having a ladder thickness and a ladder width, and said ladder stabilizer comprising:

a frame comprising a right side, a left side contralateral and substantially parallel to the right side and an intermediate portion extending from the right side to the left side, the intermediate portion being substantially orthogonal to the left side and the right side, and the frame having a top edge, and the left side having a left panel and left flanged free end perpendicular to the left panel, and the right side having a right panel and right flanged free end perpendicular to the right panel;

a rectangular channel defined between the right side, left side and intermediate portion, the channel having a channel thickness being at least the ladder thickness and the channel having a channel width being at least the ladder width;

an outrigger having a right outrigger side and a left outrigger side and a length from the right outrigger side to the left outrigger side; the right outrigger side including a right upper contact surface and an opposite right outrigger bottom and the left outrigger side including a left upper contact surface and an opposite left outrigger bottom, the right upper contact surface and left upper contact surface oriented to contact the underside of the structure;

an outrigger coupling extending from the frame to the outrigger and supporting the outrigger distal to the channel and at an outrigger peak height above the top edge of the frame, the intermediate portion being intermediate to the channel and outrigger;

the intermediate portion comprising a right intermediate portion, a left intermediate portion, and an adjustable threaded fastener, each of the first intermediate portion and the second intermediate portion having a lateral end and a medial end opposite the lateral end, the medial end of the right intermediate portion abutting the medial end of the left intermediate portion and being disposed in adjustable overlapping alignment, the lateral end of the right intermediate portion extending to the right side of the frame, and the lateral end of the left intermediate portion extending to the left side of the frame, and the adjustable threaded fastener releasably securing the medial end of the right intermediate portion to the medial end of the left intermediate portion at one of a range of intermediate positions; and the outrigger coupling comprising a support structure including a first segment and a second segment extending from the first segment at an angle of about 90 degrees relative to the first segment, the first segment being attached to the intermediate portion of the frame and the second segment being attached to the outrigger;

a socket attached to the intermediate portion of the frame, the portion of the first segment received in the socket being rotatable relative to the socket and releasably secured at an angular orientation of a range of angular orientations relative to the socket, the angular orientation defining an orientation of the outrigger relative to the horizontal; and each of the right panel and left panel of the frame comprising a proximal portion, a distal portion, and an adjustable threaded fastener, the distal portion of the left panel connecting to the lateral end of the left intermediate portion, the distal portion of the right panel connecting to the lateral end of the right intermediate portion, the distal portion of the left panel and the proximal portion of the left panel being disposed in adjustable overlapping alignment, the distal portion of the right panel and the proximal portion of the right panel being disposed in adjustable overlapping alignment, and the adjustable threaded fastener of the left panel releasably securing the distal portion of the left panel to the proximal portion of the left panel at one of a range of left panel positions, and the adjustable threaded fastener of the right panel releasably securing the distal portion of the right panel to the proximal portion of the right panel at one of a range of right panel positions.

16. The ladder stabilizer of claim 15, further comprising a left roller attached to the left panel and extending into the channel, and a right roller attached to the right panel and extending into the channel.

17. The ladder stabilizer of claim 15, further comprising a hoist, said hoist comprising a pulley secured above the frame, a tensioner secured below the frame, a tether having a first end and an opposite second end, a first portion of the tether adjacent to the first end being trained over the pulley, and a second portion of the tether adjacent to the second end of the tether being releasably locked in the tensioner, and the first end of the tether being coupled to the frame.

18. The ladder stabilizer of claim 15, further comprising a left roller attached to the left panel and extending into the channel, and a right roller attached to the right panel and extending into the channel; and a hoist, said hoist comprising a pulley secured above the frame, a tensioner secured below the frame, a tether having a first end and an opposite second end, a first portion of the tether adjacent to the first end being trained over the pulley, and a second portion of the tether adjacent to the second end of the tether being releasably locked in the tensioner, and the first end of the tether being coupled to the frame.

* * * * *